Feb. 5, 1924.
J. J. KENNEY
VALVE
Filed Oct. 31, 1919
1,482,798
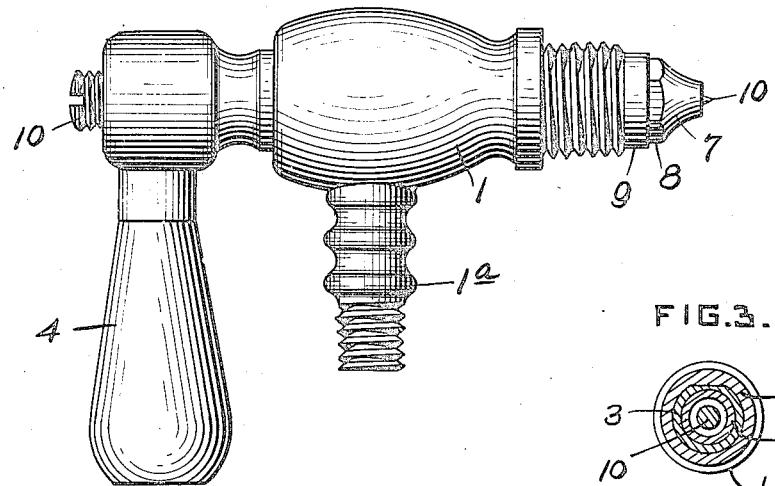
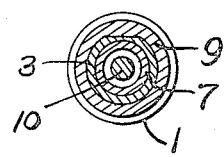
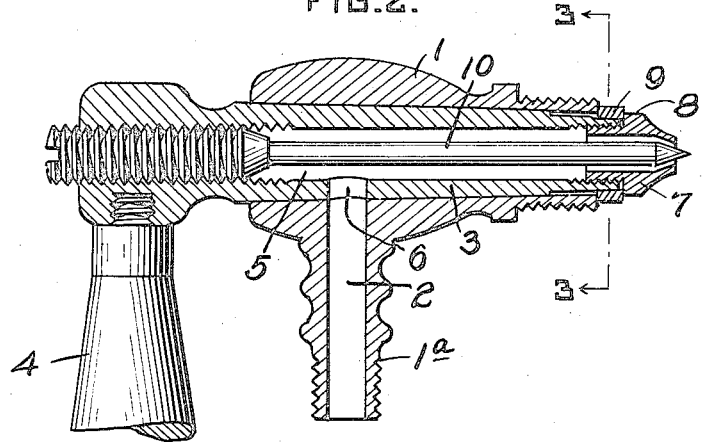
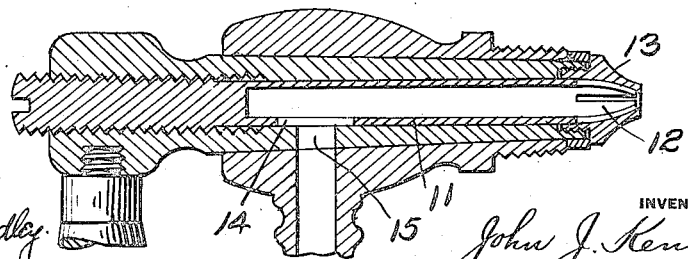

Patented Feb. 5, 1924.

1,482,798

UNITED STATES PATENT OFFICE.

JOHN J. KENNEY, OF PITTSBURGH, PENNSYLVANIA, ASSIGNOR TO LAWSON MANUFACTURING COMPANY, A CORPORATION OF PENNSYLVANIA.

VALVE.

Application filed October 31, 1919. Serial No. 334,835.

*To all whom it may concern:*

Be it known that I, JOHN J. KENNEY, a citizen of the United States, and a resident of Pittsburgh, in the county of Allegheny and State of Pensylvania, have made a new and useful Improvement in Valves, of which the following is a specification.

My invention relates to valves and especially to that type of valve or stop cock having a discharge orifice which controls the velocity of fuel or other fluid which passes thru the valve. A common construction of such valves is to make the discharge orifice in a removable part and substitute interchangeable parts with different sized orifices when the size of the discharge opening is to be changed.

If the valve is to be applied to a gas stove, to take a common use for illustration, the proper size of the orifice depends upon whether natural or artificial gas is to be used, the pressure of the gas and size of burner supplied thru the valve and other varying requirements.

Adjustable orifices for such valves have also been used but so far as I am aware their adjustment has been very inconvenient and, in some devices, only attained by disassembly of the valve with the supply line or the appliance. The desired result has also been obtained by inserting a needle valve in the supply line just before the discharge and supplementing this valve with a stop cock to afford quick, manually controlled means for regulating the flow; the latter being necessary because of the slow action of the needle valve if used for opening and closing as well as for regulation.

The object of my invention is to provide in a valve, presenting the usual compact appearance, a manually controlled cock for quickly opening and closing the valve and regulating the volume of fluid passing therethru, and a discharge orifice for same which may be adjusted finely and conveniently without disassembly of the valve with the supply line or its appliance or disassembly of the valve parts.

Figure 1 of the accompanying drawings is a side elevation of my valve; Fig. 2 is a longitudinal section thru same; Fig. 3 is a vertical, transverse section on line 3—3 of Fig. 2 and Fig. 4 is a section similar to Fig. 2 but showing a modification of my valve.

The valve body 1 has an extension 1ª for connecting to the supply line and which is provided with a fuel passage 2 opening onto a plug 3. Valve plug 3 is tapered and extends through and fits a tapered seat in body 1. One end of the plug is provided with a handle 4 and the opposite end is disposed toward the valve discharge point. Plug 3 is hollow from end to end and the hollow portion forms a fuel passage 5. The wall of the plug is provided with a connecting port 6 alined with port 2.

The discharge end of passage 5 is threaded and an orificed bushing 7 is screwed into the passage. Bushing 7 has a hexagonal flange 8 which affords a gripping surface for a wrench and the inner side of which engages a collar or abutment member 9. The other side of collar 9 bears against the end of valve body 1 and it is obvious that as bushing 7 is screwed into passage 5 its movement relative to the valve body will be stopped by collar 9 and further screwing will draw plug 3 into a tighter fit with its seat. Cooperating flat portions on collar 9 and plug 3 prevent their relative rotation but permit relative longitudinal motion.

The handle end of passage 5 is also threaded and the enlarged threaded end of an adjusting needle 10 is screwed therein. The greater part of needle 10 is slender and it extends past port 6 to the orificed bushing 7. The end of the needle adjacent bushing 7 is tapered and adapted to project into the orifice. Needle 10 may be fed in and out of the orifice of the bushing 7 by screwing it back and forth in plug 3. It is apparent that the effective orifice opening is simply adjusted from the front of the valve and without disassembly of the valve parts.

When handle 4 is turned from the position shown, it controls the amount of fluid admitted to passage 5 or shuts it off altogether, but the velocity of the discharge which determines the effectiveness of the fluid is controlled by needle 10 and orificed bushing 7 and may be regulated thru needle 10 at the threaded end of the latter and for various demands upon the valve.

The discharge orifice and the control port 6 function independently of each other altho contained in a single article no larger than the valves in common use and presenting as neat an appearance.

As collar 9 must turn with plug 3 when the latter is operated, there is no chance for frictional engagement with the valve body disturbing the adjustment of bushing 7. In other words, the collar serves as an abutment and lock for the orificed bushing.

Besides good appearance and economical cost, my valve is especially advantageous when used in close quarters where it would be awkward to apply two attachments for separately obtaining the desired results.

In the modification shown in Fig. 4, the adjusting member 11 is hollow and the fluid is admitted to its interior. The orifice end of member 11 is split to form flexible fingers 12 whose spring action causes them to bear against the inner surface of orificed bushing 13 and as member 11 is screwed backwards and forwards, the ends of fingers 12 form a diaphragm contracting and expanding the discharge opening. In this construction a port 14 is provided at one side of member 11 and elongated so as to always be presented to port 15 in the plug when the valve handle is turned to open position.

I claim:—

1. The combination with a valve body having a tapered bore and gas port leading thereinto, of a tapered plug extending through and fitting said bore and open from end to end and having a port adapted to co-operate with the body gas port, an abutment member non-rotatably mounted on the small end of said plug and bearing against the end of said body, a member threaded into the small end of said plug and having a flange engaging said abutment member and provided with an opening and a valve member co-operating with said opening and carried by a member threaded into the large end of said plug for controlling the maximum flow through the device.

2. The combination with a valve body having a tapered bore and gas port leading thereinto, of a tapered plug extending through and fitting said bore and open from end to end and having a port adapted to co-operate with the body gas port, an abutment member non-rotatably mounted on the small end of said plug and bearing against the end of said body, a member threaded into the small end of said plug and having a flange engaging said abutment member and provided with a valve seat and a needle co-operating with said seat and carried by a member threaded into the large end of said plug for controlling the maximum flow through the device.

In testimony whereof, I have hereunto subscribed my hand this 22nd day of October, 1919.

JOHN J. KENNEY.